US008060291B2

(12) United States Patent
Fuwa et al.

(10) Patent No.: US 8,060,291 B2
(45) Date of Patent: Nov. 15, 2011

(54) INTERNAL COMBUSTION ENGINE CONTROL SYSTEM

(75) Inventors: Naohide Fuwa, Aichi-ken (JP); Seiko Tamada, Toyota (JP); Keisuke Ohnishi, Kobe (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 221 days.

(21) Appl. No.: 12/595,996

(22) PCT Filed: Apr. 14, 2008

(86) PCT No.: PCT/JP2008/057278

§ 371 (c)(1),
(2), (4) Date: Oct. 15, 2009

(87) PCT Pub. No.: WO2008/133084

PCT Pub. Date: Nov. 6, 2008

(65) Prior Publication Data

US 2010/0088007 A1 Apr. 8, 2010

(30) Foreign Application Priority Data

Apr. 17, 2007 (JP) ................................ 2007-108093

(51) Int. Cl.
*G06F 19/00* (2011.01)
*G06F 17/40* (2006.01)
*G06F 12/16* (2006.01)
*F01L 1/34* (2006.01)

(52) U.S. Cl. ..................... 701/103; 701/115; 123/90.15; 702/187; 711/E12.103

(58) Field of Classification Search .......... 701/101-105, 701/109-111, 114, 115; 123/90.15-90.18, 123/316, 478, 480, 674; 702/182-185, 187; 714/2, 15, 21; 711/E12.103
See application file for complete search history.

(56) References Cited

U.S. PATENT DOCUMENTS

| | | | | |
|---|---|---|---|---|
| 5,483,945 | A * | 1/1996 | Kobayashi et al. | 123/374 |
| 6,968,268 | B2 * | 11/2005 | Yamada et al. | 701/111 |
| 7,065,307 | B2 * | 6/2006 | Takahashi | 399/53 |

FOREIGN PATENT DOCUMENTS

| | | |
|---|---|---|
| JP | 63 68200 | 5/1988 |
| JP | 2003006056 A * | 1/2003 |
| JP | 2004 293447 | 10/2004 |
| JP | 2005 11073 | 1/2005 |
| JP | 2005 11074 | 1/2005 |
| JP | 2005 11372 | 1/2005 |
| JP | 2005 11911 | 1/2005 |
| JP | 2005 201117 | 7/2005 |
| JP | 2007 23800 | 2/2007 |

* cited by examiner

*Primary Examiner* — Willis Wolfe, Jr.
(74) *Attorney, Agent, or Firm* — Oblon, Spivak, McClelland, Maier & Neustadt, L.L.P.

(57) ABSTRACT

After power supply from a backup power source to a volatile memory is restored from temporary suspension, a remaining data determining section determines whether data of change history remaining in the volatile memory is data that has been stored immediately before the suspension of the power supply. When it is determined that the data remaining in the volatile memory is not the data that has been stored immediately before suspension of the power supply, a reference value learning section moves an actuator to a limit position, assigns the reference value to an initial value, and clears the change history. When suspension of the power supply from the backup power source reoccurs before completion of the reference value learning by the reference value learning section, a control section invalidates the determination of the remaining data determining section and performs the reference value learning, after the power supply is restored.

7 Claims, 8 Drawing Sheets

Fig.6(a)

| D1 | D2 | D3 | Electric Angle Count Value |
|---|---|---|---|
| L | L | L | Abnormal |
| H | L | L | 4 |
| L | H | L | 0 |
| L | L | H | 2 |
| H | H | L | 5 |
| H | L | H | 3 |
| L | H | H | 1 |
| H | H | H | Abnormal |

Fig.6(b)

| S1 | S2 | Position Count Value |
|---|---|---|
| H | ↑ | +1 |
| H | ↓ | −1 |
| L | ↑ | −1 |
| L | ↓ | +1 |
| ↑ | H | −1 |
| ↓ | H | +1 |
| ↑ | L | +1 |
| ↓ | L | −1 |

↑ ··· Rising Edge
↓ ··· Falling Edge

INTERNAL COMBUSTION ENGINE CONTROL SYSTEM

FIELD OF THE INVENTION

The present invention relates to a control system of an internal combustion engine. The control system detects change history of a state quantity of the engine from an initial value and calculates the actual value of the state quantity based on the initial value and the change history.

BACKGROUND OF THE INVENTION

A control system disclosed in Patent Document 1 sets a target value of a maximum lift of an engine valve based on an engine operating state in such a manner as to improve the fuel efficiency and output. The control system performs a feedback control so that the actual value of the maximum lift becomes equal to the target value. Typically, the control system is configured as described below.

The control system includes an actuator changing the maximum lift and an encoder outputting a pulse signal based on operation of the actuator. A counter circuit detects the change history of the maximum lift by selectively increasing and decreasing a count value based on the pulse signal output by the encoder. The counter circuit is powered by a backup power source. When the power supply from the backup power source is suspended, for example, when the internal combustion engine stops operating, the count value is reset to 0 regardless of how long such suspension of the power supply lasts, and the change history is cleared.

After the engine is started, a microcomputer selectively charges and discharges a memory cell of a volatile memory of the microcomputer through the backup power source, thereby storing the count value of the count circuit, or the change history of the maximum lift from the initial value at the time when the engine was started. When the engine is stopped, the final value of the maximum lift is stored in a rewritable nonvolatile memory and used as the initial value of the maximum lift after the engine is restarted. The microcomputer calculates the actual value of the maximum lift based on the change history and the initial value of the maximum lift stored in the volatile memory. The microcomputer changes the maximum lift of the engine valve through the actuator in such a manner as to reduce the difference between the actual value and a target value that is set based on the operating state of the engine.

However, vibration of the vehicle body or the engine may cause a contact failure in a feeder circuit between the backup power source and the microcomputer. Specifically, temporary suspension of the power supply from the backup power source, that is, a temporary blackout, may occur. Despite the temporary power blackout, the data of the change history stored in the volatile memory remains until a certain period of time elapses after the suspension of the power supply. The remaining data is usable after the power supply is restored if the content of the data remains unchanged. However, since the state of the power supply becomes unstable before and after the temporary power blackout, the content of the data may change. Also, when vibration of the vehicle body or the engine occurs successively, temporary power blackout may reoccur in a short period of time.

Patent Document 1: Japanese Laid-Open Patent Publication No. 2005-201117

SUMMARY OF THE INVENTION

Accordingly, it is an objective of the present invention to provide a control system of an internal combustion engine that accurately calculates the actual value of a state quantity of the engine even when a temporary blackout of power supply from a backup power source reoccurs in a short period of time.

In accordance with one aspect of the present invention, a control system of an internal combustion engine is provided. The control system includes an actuator operating in an operating range in order to change a state quantity of the engine. The operating range has a limit position. A value of the state quantity that corresponds to the limit position is referred to as a reference value. The control system includes a backup power source and a history detecting section powered by the backup power source. A value of the state quantity at the time when power supply to the history detecting section is started is referred to as an initial value of the state quantity. The history detecting section in a powered state detects a change history of the state quantity from the initial value. A volatile memory is powered by the backup power source. The volatile memory in a powered state stores data of the change history. A control section calculates the actual value of the state quantity based on the initial value and the change history. The control section includes a remaining data determining section, an initial value setting section, and a reference value learning section. After power supply from the backup power source to the volatile memory is restored from temporary suspension, the remaining data determining section that determines whether the data of the change history remaining in the volatile memory is data that has been stored immediately before the suspension of the power supply. When the remaining data determining section determines that the data remaining in the volatile memory is the data that has been stored immediately before the suspension of the power supply, the initial value setting section assigns the actual value of the state quantity calculated based on the remaining data to the initial value. When the remaining data determining section determines that the data remaining in the volatile memory is not the data that has been stored immediately before the suspension of the power supply. The reference value learning section performs a reference value learning in which the reference value learning section moves the actuator to the limit position, assigns the reference value to the initial value, and clears the change history. When temporary suspension of the power supply from the backup power source reoccurs before completion of the reference value learning, the control section invalidates determination of the remaining data determining section and causes the reference value learning section to carry out the reference value learning, after restoration of the power supply.

BRIEF DESCRIPTION OF THE DRAWINGS

FIG. 6(*a*) is a table representing output signals and electric angle count values of electric angle sensors D1 to D3 illustrated in FIGS. 5(*a*) to 5(*c*);

FIG. 6(*b*) is a table representing output signals and position count values of position sensors S1 and S2 illustrated in FIGS. 5(*d*) and 5(*e*);

DETAILED DESCRIPTION OF THE PREFERRED EMBODIMENTS

FIGS. 1 to 8 illustrate one embodiment of the present invention. A control system of the presented embodiment controls the maximum lift of intake valves 20 of an internal combustion engine.

Figure 1:
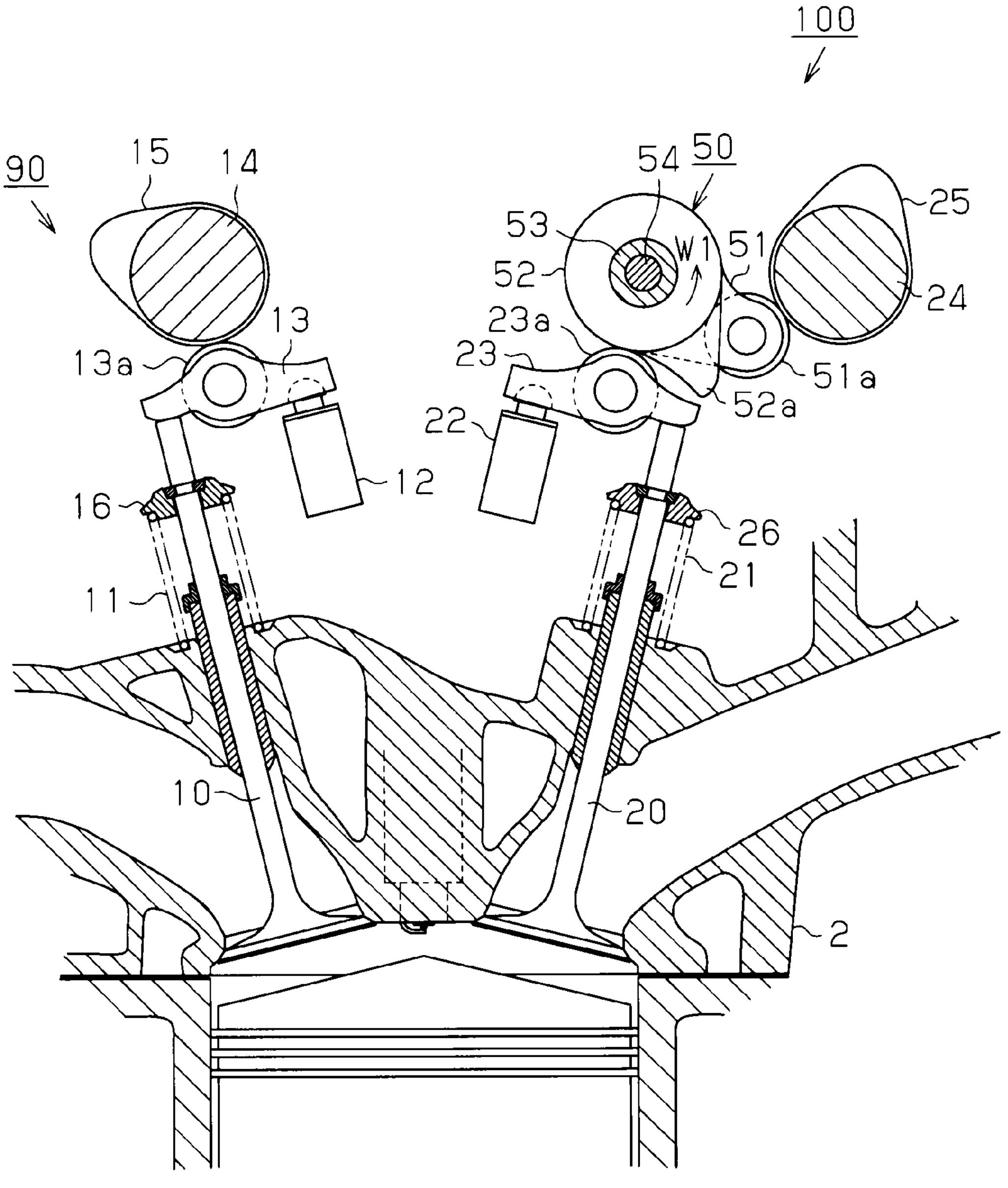
FIG. 1 is a cross-sectional view showing a portion of an internal combustion engine controlled by a control system according to one embodiment of the present invention.
Figure 2:
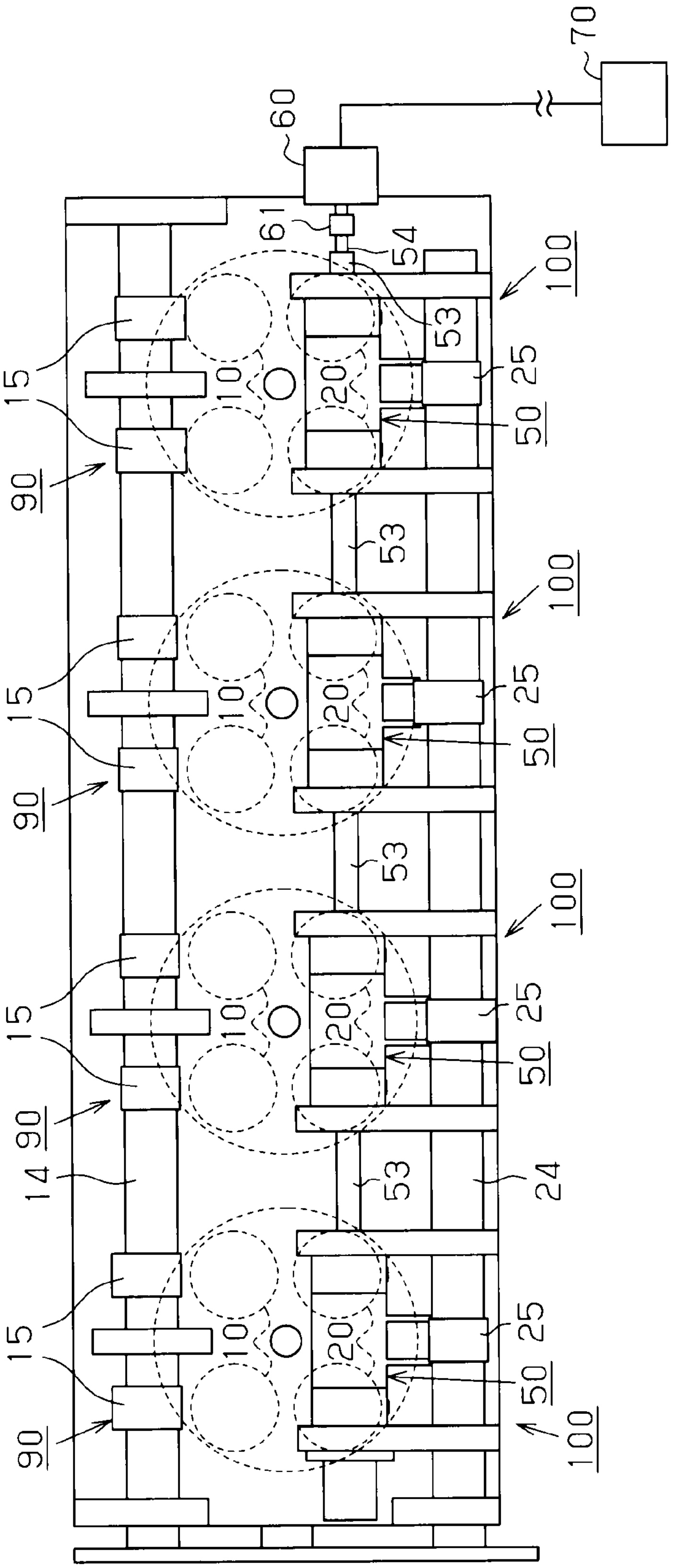
FIG. 2 is a plan view showing a valve train illustrated in FIG. 1.

As shown in FIG. 2, the engine has four cylinders. Each of the cylinders has a pair of exhaust valves 10 and a pair of intake valves 20. With reference to FIG. 1, a cylinder head 2 has an exhaust valve train 90 for the exhaust valves 10 and an intake valve train 100 for the intake valves 20.

As shown in FIG. 1, the exhaust valve train 90 has lash adjusters 12 each corresponding to one of the exhaust valves 10. A rocker arm 13 is arranged between the lash adjuster 12 and the exhaust valve 10. An end of the rocker arm 13 is supported by the lash adjuster 12 and the other end of the rocker arm 13 is held in contact with a base end of the exhaust valve 10. An exhaust camshaft 14 is rotatably supported by the cylinder head 2. A plurality of cams 15 are formed in the exhaust camshaft 14. The outer peripheral surface of each of the cams 15 contacts a roller 13*a* arranged at the center of the rocker arm 13. A retainer 16 is arranged in the exhaust valve 10. A valve spring 11 extends between the retainer 16 and the cylinder head 2. The urging force of the valve spring 11 urges the exhaust valve 10 in a direction in which the exhaust valve 10 closes. This presses the roller 13*a* of the rocker arm 13 against the outer peripheral surface of the cam 15. When the engine operates and the cam 15 rotates, the rocker arm 13 swings about the portion of the rocker arm 13 supported by the lash adjuster 12 as the fulcrum. As a result, the exhaust valve 10 is selectively opened and closed by the rocker arm 13.

With reference to FIG. 1, the intake valve train 100 has a valve spring 21, a retainer 26, a rocker arm 23, and a lash adjuster 22, like the exhaust valve train 90. An intake camshaft 24 is rotatably supported by the cylinder head 2. A plurality of cams 25 are formed in the intake camshaft 24.

As shown in FIG. 1, unlike the exhaust valve train 90, the intake valve train 100 includes an intermediate drive mechanism 50, which is located between each cam 25 and the corresponding rocker arm 23. The intermediate drive mechanism 50 has an input portion 51 and a pair of output portions 52. The input portion 51 and the output portions 52 are supported by a support pipe 53 in such a manner that the input portion 51 and the output portions 52 are allowed to swing. The support pipe 53 is fixed to the cylinder head 2. The rocker arm 23 is urged toward the output portions 52 by the urging force of the lash adjuster 22 and that of the valve spring 21. This causes a roller 23*a* to contact the outer peripheral surface of each output portion 52. The roller 23*a* is arranged at the center of the rocker arm 23. As a result, the input portion 51 and each output portion 52 are urged to swing in a leftward direction W1. A roller 51*a* is pressed against the outer peripheral surface of the cam 25. The roller 51*a* is formed at the distal end of a radially extended portion of the input portion 51.

As shown in FIG. 1, when the engine operates and the cam 25 of the intake valve train 100 rotates, the cam 25 presses the input portion 51 while sliding on the roller 51*a*. This causes the output portions 52 to swing in a circumferential direction of the support pipe 53. When the output portions 52 swing, the rocker arm 23 swings about the portion of the rocker arm 23 supported by the lash adjuster 22 as the fulcrum. As a result, the intake valve 20 is selectively opened and closed by the rocker arm 23.

With reference to FIG. 1, a control shaft 54, which is driven along the axial direction, is passed through the support pipe 53. The control shaft 54 is operably coupled to the input portion 51 and the output portions 52 through a link member.

As shown in the right end of FIG. 2, a brushless motor 60 serving as an actuator is arranged at the base end of the control shaft 54. When a microcomputer 70 controls the brushless motor 60 to displace the control shaft 54 in the axial direction, the output portions 52 swing relative to the input portion 51.

Figure 3:
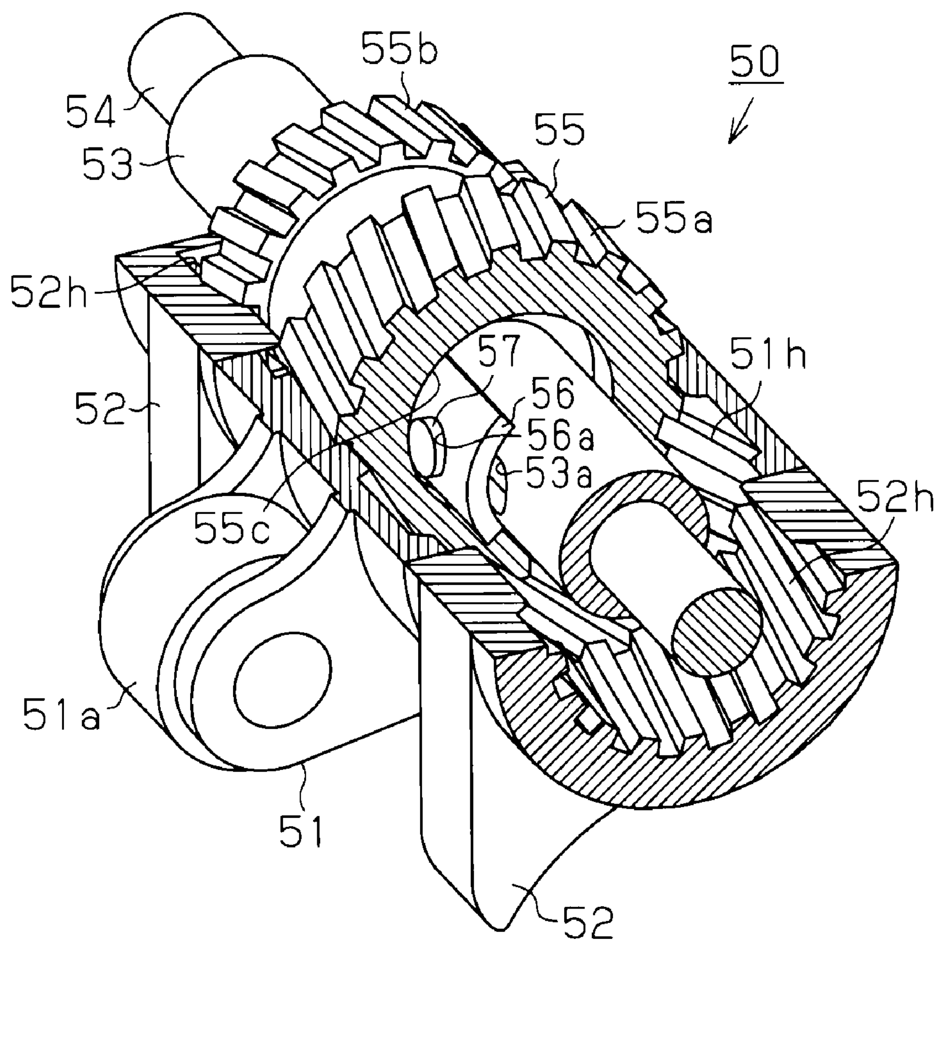
FIG. 3 is a perspective view, with a part cut away, showing an intermediate drive mechanism illustrated in FIG. 2.

FIG. 3 illustrates the internal configuration of the intermediate drive mechanism 50. The intermediate drive mechanism 50 connects the control shaft 54 to the input portion 51 and the output portions 52.

As shown in FIG. 3, the input portion 51 is located between the two output portions 52. A cylindrical communication space is formed in the input portion 51 and each of the output portions 52. An input helical spline portion 51*h* is formed in the inner circumferential surface of the input portion 51. An output helical spline portion 52*h* is formed in the inner circumferential surface of each output portion 52. The tooth trace of the output helical spline portions 52*h* is inclined in the direction opposite to the direction of the input helical spline portion 51*h*.

A cylindrical slider gear 55 is arranged in the space formed in the input portion 51 and the output portions 52. The outer circumferential surface of the slider gear 55 includes a first helical spline portion 55*a* and a pair of second helical spline portions 55*b*. The first helical spline portion 55*a* is arranged between the two second helical spline portions 55*b*. The first helical spline portion 55*a* is meshed with the input helical spline portion 51*h*. The second helical spline portions 55*b* are engaged with the corresponding output helical spline portions 52*h*.

A circumferentially extending groove 55*c* is formed in the inner wall of the slider gear 55. A bush 56 is engaged with the groove 55*c*. The bush 56 is allowed to move along the groove 55*c* and to slide circumferentially with respect to the slider gear 55. The relative displacement in the axial direction of the bush 56 relative to the slider gear 55 is restricted by the wall of the groove 55*c*.

The support pipe 53 is inserted in the space in the slider gear 55. The control shaft 54 is passed through the support pipe 53. An axially extending elongated bore 53*a* is formed in the tubular wall of the support pipe 53. An engagement pin 57 is provided between the slider gear 55 and the control shaft 54. The engagement pin 57 connects the slider gear 55 to the control shaft 54 through the elongated bore 53*a*. An end of the engagement pin 57 is received in a recess (not shown) formed in the control shaft 54 and the other end of the engagement pin 57 is passed through a through hole 56*a* formed in the bush 56.

When the control shaft 54 is axially displaced, the slider gear 55 is axially displaced together with the control shaft 54. Meshing between the first helical spline portion 55*a* and the input helical spline portion 51*h* and between the second helical spline portions 55*b* and the output helical spline portions 52*h* causes the input portion 51 and each output portion 52 to rotate in the mutually opposite directions. As a result, the relative phase difference between the input portion 51 and each output portion 52 is changed. This alters the maximum lift of the associated intake valve 20.

Figure 4:
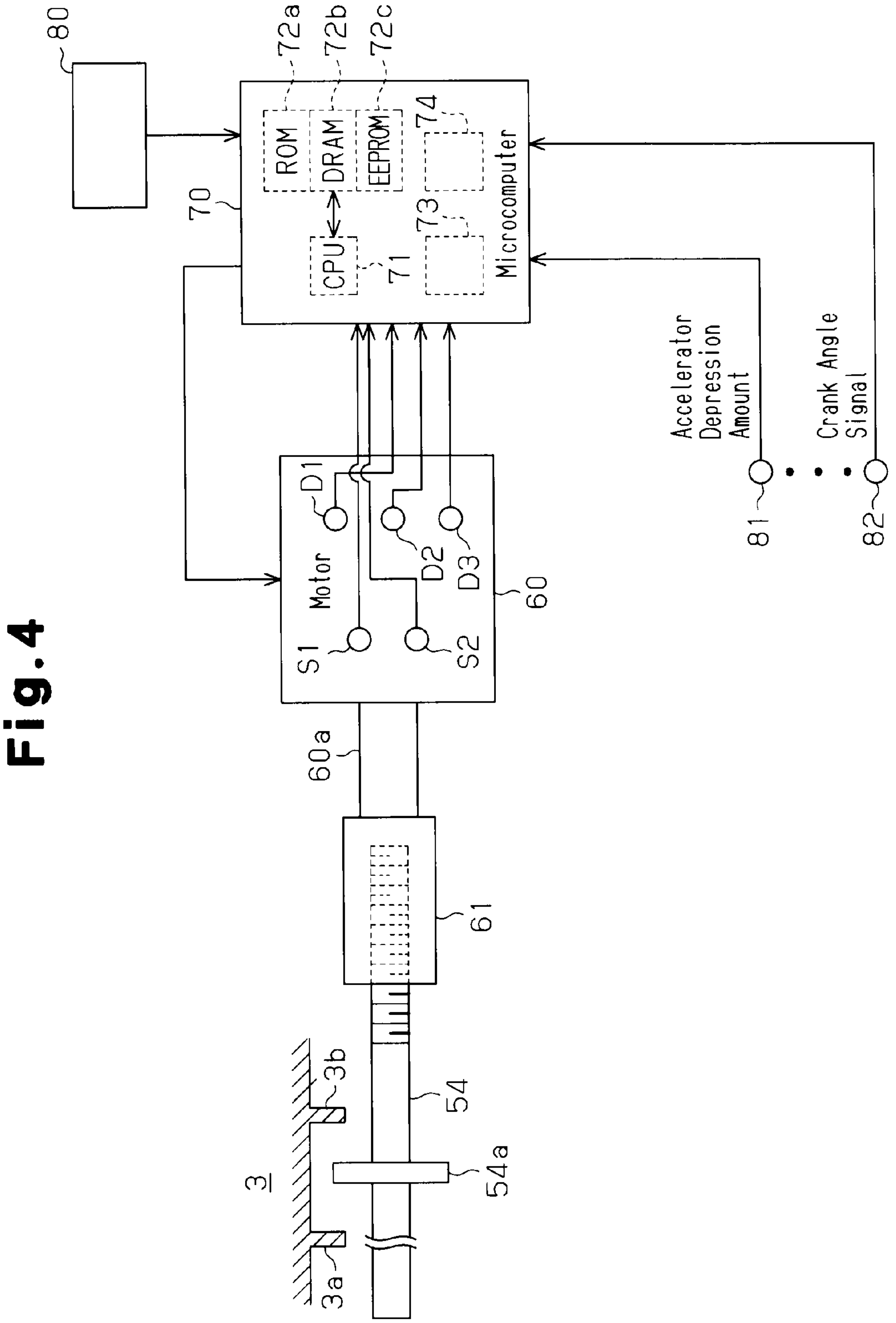
FIG. 4 is a block diagram representing a control shaft, a brushless motor, and a microcomputer illustrated in FIG. 3.
Figure 5:
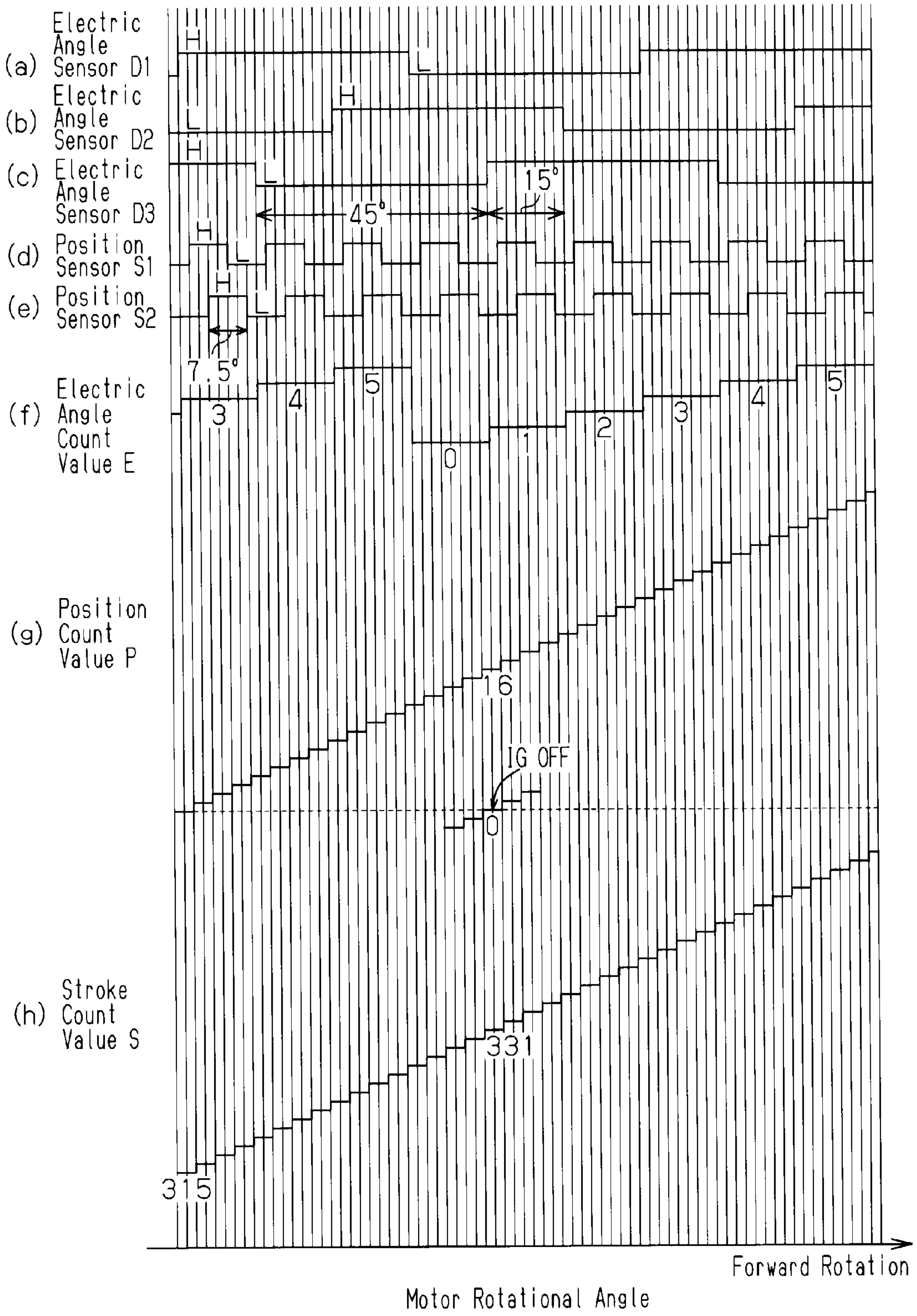
FIGS. 5(*a*) to 5(*h*) are timing charts representing output waveforms of sensors illustrated in FIG. 4 and count values of counters.

With reference to FIGS. 4 to 6, the microcomputer 70 performs feedback control in such a manner that the maximum lift of the intake valve 20 becomes equal to the target lift corresponding to the engine operating state. FIG. 4 is a block diagram representing the control shaft 54, the brushless motor 60, and the microcomputer 70. FIG. 5 is a timing chart representing changes of output waveforms and count values of various sensors.

As shown in FIG. 4, the base end of the control shaft 54 is connected to an output shaft 60*a* of the brushless motor 60 through a conversion mechanism 61. The conversion mechanism 61 converts rotation of the output shaft 60*a* into axial linear movement of the control shaft 54. Specifically, forward or reverse rotation of the output shaft 60*a* is converted into reciprocation of the control shaft 54 by the conversion mechanism 61. An engagement portion 54*a* is formed in the control shaft 54. A first stopper 3*a* and a second stopper 3*b* are formed in a cylinder head cover 3 of the internal combustion engine. The engagement portion 54*a* is capable of contacting the first stopper 3*a* and the second stopper 3*b*. The engagement portion 54*a* is displaceable between the first stopper 3*a* and the second stopper 3*b*. When the engagement portion 54*a* contacts the first stopper 3*a*, the control shaft 54 is located at a limit position, which is an Hi end. In this state, the operating amount, which is the rotational angle, of the brushless motor 60 is a designed maximum value DH0. When the engagement portion 54*a* contacts the second stopper 3*b*, the control shaft 54 is located at a Lo end. In this state, the rotational angle of the brushless motor 60 is a designed minimum value DL0.

The brushless motor 60 has electric angle sensors D1, D2, D3. A multipole magnet (not shown) with eight poles is arranged in the output shaft 60*a* in such a manner that the multipole magnet is rotatable integrally with the output shaft 60*a*. The electric angle sensors D1 to D3 output pulse signals represented in FIGS. 5(*a*) to 5(*c*) according to the magnetism of the multipole magnet with the eight poles. Each of the pulse signals represents a logic high level signal H and a logic low level signal L alternately. The electric angle sensors D1 to D3 are spaced by 120° in the circumferential direction of the output shaft 60*a*. Accordingly, an edge of the pulse signal output by any one of the electric angle sensors D1 to D3 is generated every 45° of rotation of the output shaft 60*a*. The phase of the pulse signal of any one of the electric angle sensors D1 to D3 is offset from the phase of the pulse signal of another one of the electric angle sensors D1 to D3 by the amount corresponding to 30° of rotation of the output shaft 60*a* in the advancing direction or the retarding direction.

The brushless motor 60 has two position sensors S1, S2 each serving as a rotary encoder and a multipole magnet (not shown) with 48 poles, which rotates integrally with the output shaft 60*a* in correspondence with the position sensors S1, S2. The position sensors S1 and S2 output pulse signals represented in FIGS. 5(*d*) and 5(*e*), respectively, which are alternating logic high level signals H and logic low level signals L. In order to obtain the waveform of this pulse signal, the position sensor S1 is spaced from the position sensor S2 by 176.25° in the circumferential direction of the output shaft 60*a*. Accordingly, an edge of the pulse signal output by either one of the position sensors S1, S2 is generated every 7.5° of rotation of the output shaft 60*a*. The phase of the pulse signal of the position sensor S2 is offset from the phase of the pulse signal of the position sensor S1 by the amount corresponding to 3.75° of rotation of the output shaft 60*a* in the advancing direction or the retarding direction.

The edges of the combined pulse signal of the electric angle sensors D1 to D3 are spaced at intervals of 15°. Contrastingly, the edges of the combined pulse signals of the position sensors S1, S2 are spaced at intervals of 3.75°. Accordingly, four edges are generated in the combined pulse signals of the position sensors S1, S2 in the period from one edge to a subsequent edge of the combined pulse signals of the electric angle sensors D1 to D3.

The pulse signals output by the electric angle sensors D1 to D3 and the position sensors S1, S2 are received by the microcomputer 70. The microcomputer 70 includes a CPU 71, a ROM 72*a*, a DRAM 72*b*, and an EEPROM 72*c*. The CPU 71, which serves as a control section, is a central processing unit that performs calculation and information processing in accordance with programs. The ROM 72*a* is a nonvolatile memory storing programs and data necessary for various types of control. The DRAM 72*b* is a volatile memory temporarily storing input data and calculation results. The DRAM 72*b* has a first address ADP1 and a second address ADP2. The EEPROM 72*c* is a rewritable nonvolatile memory storing initial values obtained through learning control.

Figure 8A:
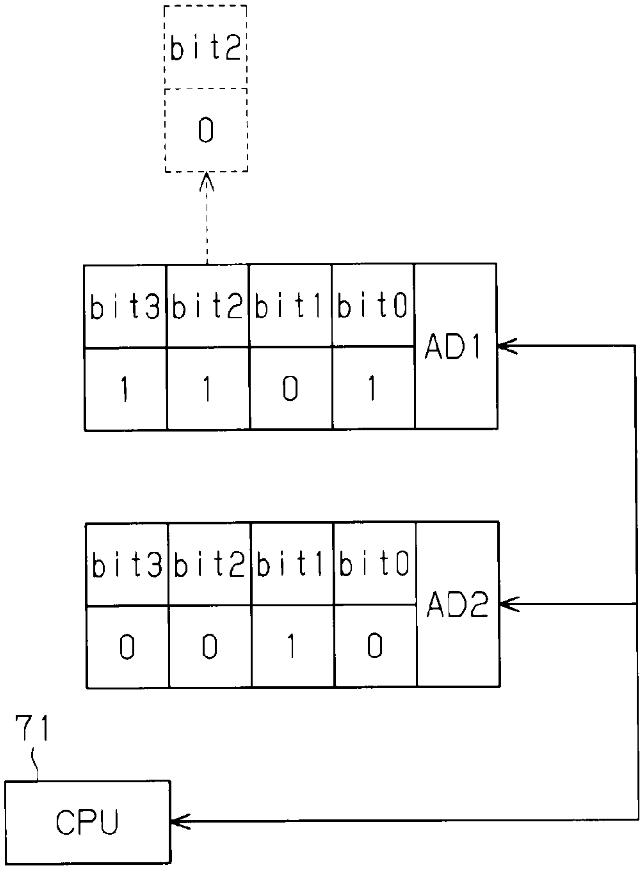
FIGS. 8(*a*) and 8(*b*) are diagrams representing bit data of a specific example of FIG. 7.
Figure 8B:
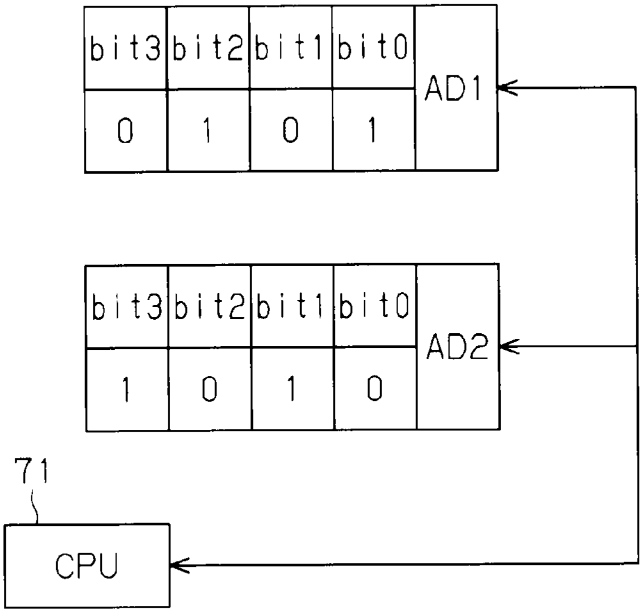

The CPU 71, the ROM 72*a*, the DRAM 72*b*, and the EEPROM 72*c* are powered by the backup power source 80. The DRAM 72*b* has the first address ADP1 and the second address ADP2, which are represented in FIG. 8. The first address ADP1 has four memory cells. Specifically, the first address ADP1 has four bit data values configured by 0th to 3rd bits. Similarly, the second address ADP2 has 0th to 3rd bits.

When the CPU 71 stores data in the DRAM 72*b*, the 0th to 3rd bits are set to the bit data values 1 or 0. Specifically, the bit data value of a memory cell in which charges are accumulated by the CPU 71 is 1. The bit data value of a memory cell in which the charges are not accumulated is 0. The first address ADP1 shown in FIG. 8(*a*) stores data 1101.

Sensors detecting the engine operating state such as an acceleration sensor 81 detecting the depression amount of the accelerator pedal of the vehicle and a crank angle sensor 82 detecting the rotational phase of a crankshaft of the internal combustion engine. The CPU 71 sets a control target value of the maximum lift of the intake valve 20 based on the engine operating state. The CPU 71 detects the rotational phase of the brushless motor 60, in other words, the actual value of the maximum lift of the intake valve 20, based on the pulse signals output by the electric angle sensors D1 to D3 and the position sensors S1 and S2.

The CPU 71 has an electric angle counter circuit 73 and a position counter circuit 74. The electric angle counter circuit 73 selectively increases and decreases an electric angle count value E based on the pulse signals of the electric angle sensors D1 to D3. The position counter circuit 74 selectively increases and decreases a position count value P based on the pulse signals of the position sensors S1, S2. The electric angle counter circuit 73 and the position counter circuit 74 are powered by the backup power source 80. The CPU 71 detects the actual value of the rotational phase of the brushless motor 60, which is the maximum lift of the intake valve 20, based on the electric angle count value E and the position count value P. Position count data PD as data of the position count value P is stored in the DRAM 72*b*. While held in a powered state, the position counter 74 is a history detecting section detecting the position count value P.

With reference to FIGS. 5 and 6, a procedure for detecting the actual value of the maximum lift of the intake valve 20 will be explained.

FIGS. 5(*a*) to 5(*e*) represent the waveforms of the pulse signals output by the electric angle sensors D1 to D3 and the position sensors S1, S2 when the output shaft 60*a* of the brushless motor 60 rotates as has been described. FIGS. 5(*f*) to 5(*h*) represent patterns of changes of the electric count value E, the position count value P, and a stroke count value S with respect to changes of the rotational angle of the brushless motor 60 when the brushless motor 60 rotates. FIG. 6(*a*) represents the correspondence relationship between the patterns of the signals output by the electric angle sensors D1 to D3 and the electric angle count value E. FIG. 6(*b*) represents how the position count value P increases or decreases when an edge is generated in the output signals of the position sensors S1, S2.

The respective count values will now be explained. The position count value P corresponds to the change history of the maximum lift from the initial value at the time when power supply is started. The actual value of the position count value P corresponds to the actual value of the maximum lift calculated based on the change history.

[Electric Angle Count Value E]

The electric angle count value E is set by the electric angle counter circuit 73 based on the pulse signals of the electric angle sensors D1 to D3 and represents the rotational phase of the brushless motor 60. Specifically, as shown in FIG. 6(*a*), depending on which of the logic high level signal H and the logic low level signal L the electric angle sensors D1 to D3 output, the electric angle count value E is set to a suitable one of successive integer values from 0 to 5 and stored in the DRAM 72*b*. The correspondence relationship between the combinations of the pulse signals of the electric angle sensors D1 to D3 and the electric angle count value E, which is shown in FIG. 6(*a*), is stored in the ROM 72*a*.

The CPU 71 detects the rotational phase of the brushless motor 60 based on the electric angle count value E stored in the DRAM 72*b*. The CPU 71 then operates to rotate the brushless motor 60 in a forward direction or a reverse direction by switching the current supply phases of the brushless motor 60. When the brushless motor 60 rotates in the forward direction, the electric angle count value E is switched in the ascending order of 0→1→2→3→4→5→0. In contrast, when the brushless motor 60 rotates in the reverse direction, the electric angle count value E is switched in the descending order of 5→4→3→2→1→0→5.

When the power supply from the backup power source 80 is suspended, such as when operation of the engine is stopped, the position count value P, which is selectively increased and decreased by the electric angle counter circuit 73, is reset to 0 regardless of how long suspension of the power supply lasts. When the power supply from the backup power source 80 is started, the CPU 71 sets the initial value of the electric angle count value E to the count value corresponding to the current combination of the pulse signals, with reference to the correspondence relationship between the combinations of the pulse signals of the electric angle sensors D1 to D3 and the electric angle count value E, which is stored in the ROM 72*a*.

[Position Count Value P]

The position count value P is counted by the position counter circuit 74 based on the pulse signals of the position sensors S1, S2. The position count value P represents the amount of displacement of the rotational angle of the output shaft 60*a* with respect to the initial value of this rotational angle at the time when the engine is started. In other words, the position count value P represents the change history of the maximum lift of the intake valve 20 from the initial value. With reference to FIG. 6(*b*), +1 or −1 is added to the position count value P depending on which of the rising edge and the falling edge has been generated in the pulse signal of the position sensor S1 and which of the logic high level signal H and the logic low level signal L the position sensor S2 is outputting. In FIG. 6(*b*), the up-arrows each represent a rising edge of the pulse signals and the down-arrows each represent a falling edge of the pulse signals. In other words, the position count value P represents the count of the edges of the pulse signals of the position sensors S1, S2.

When the brushless motor 60 rotates in the forward direction, 1 is added to the position count value P for every edge of the pulse signals of the position sensors S1, S2, which are represented in FIGS. 5(*d*) and 5(*e*), respectively. The position count value P changes rightward in a pattern shown in FIG. 5(*g*). When the brushless motor 60 rotates in the reverse direction, 1 is subtracted from the position count value P for every edge of the pulse signals, and the position count value P changes leftward in a pattern shown in FIG. 5(*g*).

When the power supply from the backup power source 80 is suspended, such as when the engine stops operating, the position count value P is reset to 0 regardless of how long such suspension lasts. When the power supply from the backup power source 80 is started, the position count value P is increased or decreased from 0 based on the pulse signals of the position sensors S1, S2. Accordingly, the position count value P is the change history representing how much the rotational position of the output shaft 60*a* of the brushless motor 60 has changed from the initial position at the time when the power supply from the backup power source 80 was started. In other words, the position count value P represents change of the maximum lift of the intake valve 20 while the engine is operating with respect to the maximum lift at the time when the engine was started.

[Stroke Count Value S]

The stroke count value S represents the rotational angle of the brushless motor 60 when the rotational angle of the output shaft 60*a* at the time when the control shaft 54 is displaced to the Hi end is defined as a reference value (0 degrees). Specifically, in the present embodiment, the reference value S0 of the stroke count value S is 0. In other words, the CPU 71 sets the stroke count value S to 0 when the control shaft 54 is displaced to the Hi end. In this manner, the initial setting, or reference value setting, of the stroke count value S is performed. The reference value S0 is stored in the ROM 72*a*. The CPU 71 updates the stroke count value S by adding the position count value P to the stroke count value S. When the engine is completely stopped and the operation of the intake valve train 100 is stopped, the final value of the stroke count value S is stored in the EEPROM 72*c* as an operation initial value Sg for the next time the engine is started. In other words, the operation initial value Sg represents the initial value of the stroke count value S at the time when the engine is restarted. Accordingly, the operation initial value Sg represents the stroke count value S at the time when the power supply to the DRAM 72*b* is started.

The CPU 71 calculates the stroke count value S based on the operation initial value Sg stored in the EEPROM 72*c* and the position count value P stored in the DRAM 72*b*. The CPU 71 calculates the actual value of the maximum lift of the intake valve 20 based on the stroke count value S. The CPU 71 controls the brushless motor 60 in such a manner as to reduce the difference between the actual value and the control target value set based on the engine operating state. Accordingly, the maximum lift of the intake valve 20 is changed to a value suitable for the engine operating state, and the fuel efficiency and output of the internal combustion engine are improved.

The problems of the control system and the solutions brought about by the present embodiment will hereafter be explained.

For example, vibration of the vehicle body or the engine may cause a contact failure in the feeder circuit extending from the backup power source 80 to the microcomputer 70. That is, temporary suspension of the power supply from the backup power source 80 to the microcomputer 70, or temporary power blackout, may occur. In this case, the position count value P is reset to 0. The position count data PD stored in the DRAM 72*b* remains for a short while after the power supply is cut. However, since the state of the power supply from the backup power source 80 to the microcomputer 70 is unstable before and after the temporary power blackout, the charges accumulated in the memory cells of the DRAM 72*b* may be discharged. Also, an inrush current flowing into a memory cell may unexpectedly charge the memory cell. Accordingly, even when the position count data PD remains after the power supply is restored from the temporary power blackout, the content of the data may have been changed. If such changed position count data PD is employed, the maximum lift cannot be accurately controlled.

The CPU 71 suppresses adverse influences of the temporary power blackout through the following procedure. Specifically, in normal operation, the CPU 71 stores the position count data PD in the first address ADP1 of the DRAM 72*b*. The CPU 71 stores comparative data, which is set in such a manner as to represent a certain correspondence relationship with the position count data PD, in the second address ADP2. In the present embodiment, mirrored data MD with respect to the position count data PD is stored in the second address ADP2. After the power supply is restored from the temporary power blackout with respect to the data in the first address ADP1, it is determined whether the correspondence relationship is saved between the data remaining in the first address ADP1 and the data remaining in the second address ADP2. If it is determined that the correspondence relationship is saved, it is determined whether the remaining data represents the content that has been stored immediately before the temporary power blackout. The CPU 71 calculates the stroke count value S based on the operation initial value Sg and the position count value P represented by the remaining data.

Due to the temporary power blackout, the position count value P is reset to 0. Correspondingly, the current stroke count value S is assigned to the operation initial value Sg. The operation initial value Sg is used for subsequent calculation of the stroke count value S. Accordingly, the calculation of the stroke count value S is resumed based on the position count value P and the operation initial value Sg. Thus, eve if temporary power blackout occurs, the control of the maximum lift is resumed immediately after the power supply from the backup power source 80 is restored.

However, when it is determined that the correspondence relationship between the remaining data has not been saved, it is determined that the content of the data stored in at least one of the addresses has been changed by the temporary power blackout. Normal control of the maximum lift is then suspended, and learning of the reference value of the maximum lift is carried out. Specifically, the control shaft 54 is moved to the Hi end and the reference value S0 is assigned to the operation initial value Sg. Further, the position count value P is reset to 0. Accordingly, based on the position count value P and the operation initial value Sg, the calculation of the stroke count value S is resumed. When the reference value learning is performed after the temporary power blackout as in this case, the position count value P has first been reset to 0 due to the temporary power blackout. Afterwards, when the control shaft 54 is displaced, the position count value P is updated and stored in the DRAM 72*b*. The reference value learning does not necessarily have to be performed by moving the control shaft 54 to the Hi end but may be carried out by moving the control shaft 54 to the Lo end.

In the above-described manner, the reference value learning of the maximum lift is accomplished. As a result, even when the position count data PD is lost in the temporary power blackout of the backup power source 80, control of the maximum lift is resumed when the power supply is restored after the temporary power blackout.

However, when vibration of the vehicle body or the internal combustion engine occurs successively, the temporary power blackout of the backup power source 80 may reoccur before completion of the reference value learning. In this case, when the power supply is restored after the temporary blackout, it is determined whether the correspondence relationship has been saved between the position count data PD remaining in the first address ADP1 and the mirrored data MD remaining in the second address ADP2. When the correspondence relationship has not been saved, in other words, when the position count data PD in the DRAM 72*b* has been changed due to the temporary power blackout that has reoccurred, the reference value learning is performed again. In contrast, when the correspondence relationship has been saved, in other words, when the position count data PD stored in the DRAM 72*b* has not been changed, the stroke count value S is calculated based on the position count value P represented by the remaining data and the operation initial value Sg. Further, by assigning the stroke count value S to the operation initial value Sg, the CPU 71 resumes control of the maximum lift. The operation initial value Sg is used for the subsequent calculation of the stroke count value S.

However, when the power supply is restored after the temporary blackout that has reoccurred, the position count data PD remaining in the DRAM 72*b* does not represent the change history of the position count value P from the operation initial value Sg at the time when the engine was started. The position count data PD remaining in the DRAM 72*b* is the data that has been stored in the DRAM 72*b* while the reference value learning was being carried out. Accordingly, at the restoration of the power supply after the reoccurred temporary blackout, an accurate stroke count value S cannot be obtained using the position count data PD remaining in the DRAM 72*b*.

Figure 7:
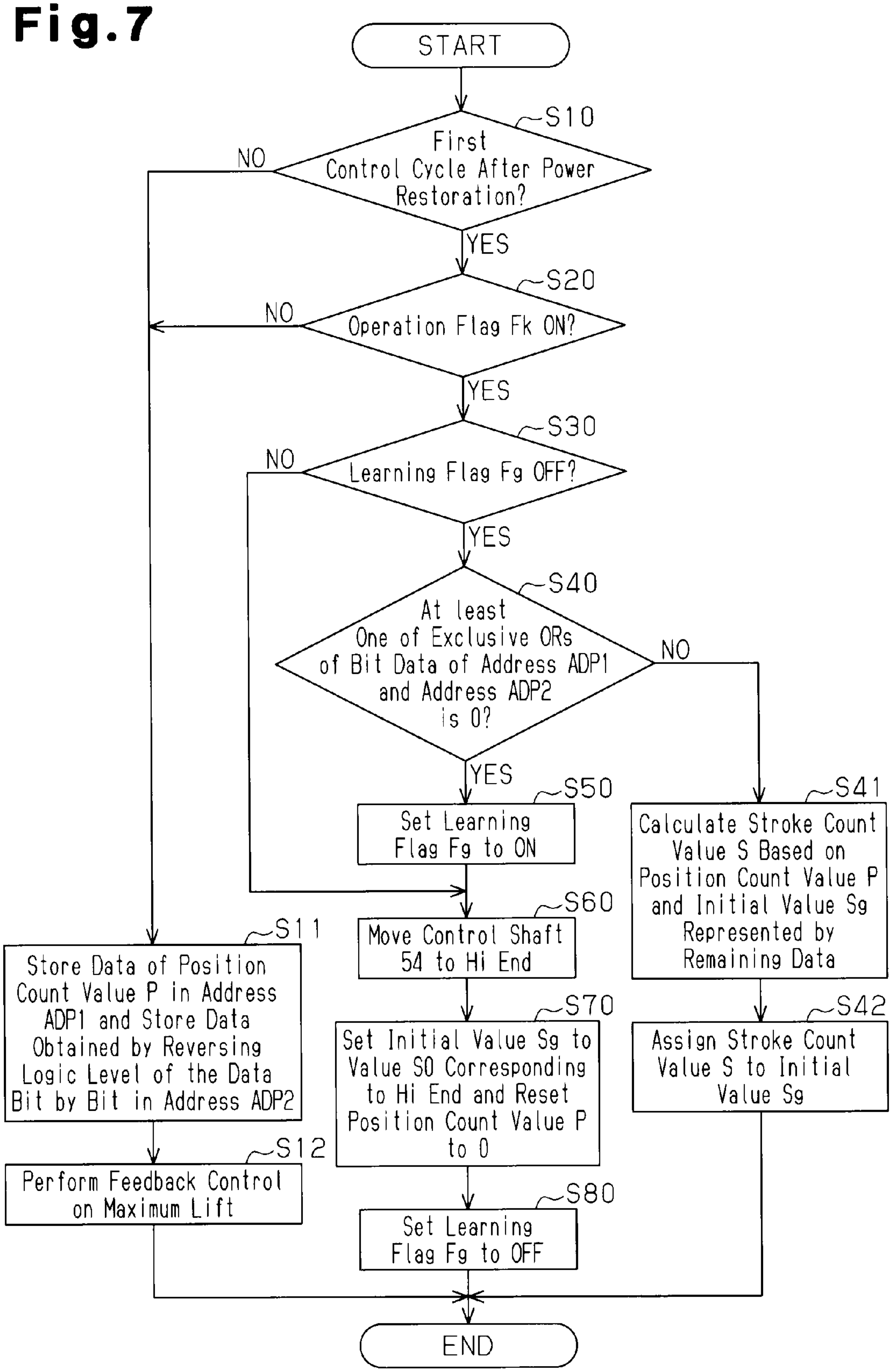
FIG. 7 is a flowchart of operation of the microcomputer illustrated in FIG. 4 when a temporary power blackout of a backup power source occurs.

The control system of the present embodiment avoids such disadvantage by performing the procedure represented by the flowchart of FIG. 7. The flowchart of FIG. 7 represents the procedure carried out in response to the temporary power blackout of the backup power source 80. The CPU 71 repeatedly performs the procedure of the flowchart of FIG. 7 at constant control cycles.

In step S10, the CPU 71 determines whether the current control cycle is a first control cycle after the power supply from the backup power source 80 has been started.

When the determination in step S10 is negative, specifically, when the current control cycle is not the first control cycle after the power supply has been started, the CPU 71 determines that there has been no temporary power blackout and performs steps S11 and S12. In step S11, the CPU 71 stores the position count data PD in the first address ADP1 of the DRAM 72*b*. The CPU 71 also stores, as comparative data, the mirrored data MD obtained by inverting the logic level of the position count data PD bit by bit in the second address ADP2 of the DRAM 72*b*.

In step S12, the CPU 71 calculates the actual value of the maximum lift of the intake valve 20 based on the position count value P stored in the first address ADP1 and the operation initial value Sg stored in the EEPROM 72*c*. The CPU 71 feedback-controls the brushless motor 60 in such a manner as to reduce the difference between the actual value and the control target value of the intake valve 20, which is set based on the engine operating state. The CPU 71 then suspends the procedure.

If the determination of step S10 is positive, in other words, if the current control cycle is the first control cycle after the power supply has been started, the CPU 71 determines that there has been a temporary power blackout and carries out step S20. In step S20, the CPU 71 determines whether an operation flag Fk is ON. The operation flag Fk represents a started/stopped state of the engine. The CPU 71 sets the operation flag Fk based on manipulation of the ignition switch of the engine and stores the operation flag Fk in the EEPROM 72*c*. The CPU 71 sets the operation flag Fk to ON when the ignition switch is turned on and to OFF when the ignition switch is turned off. When the ignition switch is turned off, the CPU 71 suspends the power supply from the backup power source 80 by setting the operation flag at OFF and then blocking the relay. Accordingly, in the control cycle immediately after the power restoration from a temporary power blackout, the operation flag Fk remains ON.

When the determination of step S20 is negative, specifically, when the operation flag Fk is OFF, the CPU 71 determines that the current control cycle is not a control cycle after power restoration from a temporary power blackout, but a normal control cycle after the power supply has been started. The CPU 71 then performs steps S11 and S12. In other words, the CPU 71 performs the normal feedback control on the maximum lift and suspends the procedure.

If the determination of step S20 is positive, in other words, if the operation flag Fk is ON, the CPU 71 determines that the current control cycle is a control cycle immediately after power restoration from a temporary power blackout, and carries out step S30. In step S30, the CPU 71 determines whether a learning flag Fg is OFF. The learning flag Fg is stored in the EEPROM 72*c*. The learning flag Fg is an information value indicating whether the reference value learning of the maximum lift was performed in the control cycle immediately before the temporary power blackout. The learning flag Fg is set to OFF after the engine is started. The learning flag Fg is set to ON when the reference value learning is started and to OFF when the reference value learning is ended.

If the determination in step S30 is positive, specifically, if the leaning flag Fg is OFF, the CPU 71 determines that the control cycle immediately before the temporary power blackout was a normal control cycle, and performs step S40. In step S40, the CPU 71 determines whether the exclusive OR of at least one of corresponding pairs of bits of the data remaining in the first address ADP1 and the data remaining in the second address ADP2 is 0. When performing step S40, the CPU 71 functions as a remaining data determining section.

If the determination of step S40 is negative, in other words, if all of the exclusive ORs of the mutually corresponding bit data of the data remaining in the first address ADP1 and the data remaining in the second address ADP2 are 1, it is determined that the data remaining in the first address ADP1 and the data remaining in the second address ADP2 are the data that have been stored in the DRAM 72*b* in the control cycle immediately before the temporary power blackout. In this case, in step S41, the CPU 71 calculates a current stroke count value S based on the position count value P represented by the data remaining in the first address ADP1 and the operation initial value Sg stored in the EEPROM 72*c*. In step S42, the CPU 71 assigns the obtained stroke count value S to the operation initial value Sg and stores the operation initial value Sg in the EEPROM 72*c*. When performing step S42, the CPU 71 functions as an initial value setting section.

If the determination of step S40 is positive, specifically, if at least one of the exclusive ORs of the mutually corresponding bit data of the data remaining in the first address ADP1 and the data remaining in the second address ADP2 is 0, the CPU 71 determines that at least one of the data of the first address ADP1 and the data of the second address ADP2 has been changed due to the temporary power blackout of the backup power source 80. In this case, the CPU 71 sets the learning flag Fg to ON in step 50 and carries out the reference value learning of the maximum lift. Specifically, in step S60, the CPU 71 moves the control shaft 54 to the Hi end and assigns the reference value S0 to the operation initial value Sg. In other words, the CPU 71 sets the operation initial value Sg to the reference value S0. When carrying out step S60, the CPU 71 functions as a reference value learning section. Further, in step S70, the CPU 71 resets the position count value P to 0.

In the reference value learning after the temporary power blackout, the position counter circuit 74 first clears the position count value P due to the temporary power blackout. The position count value P is updated through actuation of the brushless motor 60 and stored in the DRAM 72*b*. In the period from when the reference value learning is started to when the control shaft 54 is moved to the Hi end, the position count value P is updated based on the pulse signals of the position sensors S1, S2 and stored in the DRAM 72*b*. After the reference value learning is complete, the CPU 71 sets the learning flag Fg to OFF in step S80 and suspends the procedure.

When negative determination is made in step S30, in other words, when the learning flag Fg is ON, the CPU 71 determines that the control cycle immediately before the temporary power blackout was the control cycle performed while the reference value learning of the maximum lift was being performed. The CPU 71 then skips step S40 and carries out step S60. In other words, the CPU 71 invalidates the procedure of step S40 and performs steps S60 and S70. That is, the CPU 71 carries out the reference value learning of the maximum lift without performing determination about the data remaining in the first address ADP1 and the second address ADP2. After the reference value learning is complete, the CPU 71 sets the learning flag Fg to OFF in step S80 and suspends the procedure.

FIG. 8 represents a specific example of the flowchart of FIG. 7.

FIG. 8(*a*) represents a case in which the current control cycle is a normal control cycle immediately before a temporary power blackout of the backup power source 80, in other words, the determination of step S10 is negative and the position count value P is 13. In step S11, the CPU 71 stores the data 1101 corresponding to the count value 13 in the 0th to 3rd bits of the first address ADP1. The CPU 71 then stores the mirrored data MD 0011, which is obtained by inverting the logic level of 1101 bit by bit, in the 0th to 3rd bits of the second address ADP2.

When a temporary power blackout occurs in a normal control cycle and the power is restored, the learning flag Fg is OFF in the control cycle immediately after the power restoration. The determination of step S30 is thus positive and step S40 is performed. In step S40, the CPU 71 determines whether at least one of the exclusive ORs of the mutually corresponding bit data of the data remaining in the first address ADP1 and the data remaining in the second address ADP2 is 0.

If negative determination is made in step S40, specifically, if the exclusive ORs of the 0th to 3rd bits are all 1, the CPU 71 determines that the data remaining in the first address ADP1 and the data remaining in the second address ADP2 are the data that have been stored in the DRAM 72*b* in the control cycle immediately before the temporary power blackout. In this case, in step S41, the CPU 71 calculates the current stroke count value S based on the position count value P, which is 13, represented by the remaining data of the first address ADP1 and the operation initial value Sg stored in the EEPROM 72*c*. In step S42, the CPU 71 updates the operation initial value Sg by assigning the obtained stroke count value S to the operation initial value Sg. The CPU 71 stores the operation initial value Sg in the EEPROM 72*c*.

The broken lines of FIG. 8(*a*) represent a case in which the data remaining in the first address ADP1 is 1001 in the control cycle immediately after the power restoration from the temporary power blackout. Specifically, the charges of the memory cell corresponding to the 2nd bit of the first address ADP1 have been discharged due to the temporary power blackout. In this case, the determination of step S40 is positive. In other words, the exclusive OR of the 2nd bit data of the first address ADP1 and the 2nd bit data of the second address ADP2 is 0. The CPU 71 determines that at least one of the data of the first address ADP1 and the data of the second address ADP2 has been changed by the temporary power blackout of the backup power source 80 and performs step S50. In step S50, the CPU 71 sets the learning flag Fg to ON and carries out the reference value learning of the maximum lift. In step S60, the CPU 71 moves the control shaft 54 to the Hi end. The CPU 71 assigns the reference value S0 to the operation initial value Sg in step S70. Further, in this step, the CPU 71 resets the position count value P to 0. After completion of the reference value learning, the CPU 71 sets the learning flag Fg to OFF in step S80.

In the period from when the reference value learning is started to when the control shaft 54 is moved to the Hi end, in other words, during the procedure of step S60, the position counter circuit 74 increases the position count value P from 0 based on the pulse signals of the position sensors S1, S2. The position count value P output by the position counter circuit 74 is stored in the DRAM 72*b*.

A case in which the temporary power blackout of the backup power source 80 reoccurs after the reference value learning of the maximum lift has started but not yet ended will be explained. By way of example, assume that the temporary power blackout reoccurs when the procedure of step S60 is being carried out and the position count value P is increasing from 0 to 5. In this case, since the temporary power blackout has reoccurred before completion of the reference value learning, the learning flag Fg remains ON until the power is restored from the temporary blackout. Accordingly, the CPU 71 makes negative determination in step S30. As a result, the CPU 71 skips step S40 and carries out steps S60 and S70. In other words, the CPU 71 invalidates the determination of step S40 and performs the reference value learning of the maximum lift.

When data 0101 remains in the first address ADP1 and data 1010 remains in the second address ADP2 in the control cycle immediately after the power restoration from the temporary blackout before completion of the reference value learning, the CPU 71 operates as below. In this case, the exclusive ORs of the bit data are all 1. However, the CPU 71 does not use the position count value P 5 represented by the data 0101 remaining in the first address ADP1 for calculation of the stroke count value S and re-performs the reference value learning of the maximum lift. The CPU 71 does not use the operation initial value Sg stored in the EEPROM 72*c* for the calculation of the stroke count value S either and assigns the reference value S0 to the operation initial value Sg through the reference value learning of step S70. After the reference value learning is ended, the CPU 71 sets the learning flag Fg to OFF in step S80.

The present embodiment has the following advantages.

(1) When a temporary power blackout of the backup power source 80 occurs before the control shaft 54 reaches the Hi end in the reference value learning of the maximum lift, the CPU 71 operates as follows. Specifically, the CPU 71 carries out the reference value learning of the maximum lift, regardless of whether the position count data PD remaining in the DRAM 72*b* is the data that has been stored in the control cycle immediately before the temporary power blackout. In this manner, the CPU 71 avoids erroneous calculation of the stroke count value S when the power is restored from the temporary power blackout that has reoccurred. In other words, the operation initial value Sg, which is used for subsequent calculation of the stroke count value S, is prevented from being set to a value different from the current stroke count value S. Accordingly, the CPU 71 accurately determines the actual value of the maximum lift even when a temporary power blackout of the backup power source 80 reoccurs before completion of the reference value learning of the maximum lift.

Specifically, after the power is restored from the temporary power blackout that has reoccurred, the position count data PD remaining in the DRAM 72*b* may be the data that was stored immediately before the temporary power blackout reoccurred. The CPU 71 solves the problem that may be caused in this case. Specifically, the position count data PD remaining in the DRAM 72*b* represents the change history of the stroke count value S that has been tracked after the power restoration from the previous temporary power blackout. If the stroke count value S is calculated based on the position count value P represented by such change history and the operation initial value Sg that has been set before the previous temporary power blackout, an accurate stroke count value S cannot be obtained. However, this problem is avoided by the CPU 71 of the present embodiment.

The present embodiment may be modified as follows.

The comparative data related to the position count data PD is not restricted to the mirrored data MD. As long as the comparative data stored in the DRAM 72*b* has a certain correspondence relationship with the position count data PD, the comparative data may be any suitable type of data.

The volatile memory is not restricted to the DRAM 72*b*, but may be an SRAM.

The rewritable nonvolatile memory that stores the operation initial value Sg is not restricted to the EEPROM 72*c* but may be an MRAM (Magnetic RAM) or an FeRAM (Ferroelectric RAM).

The control system according to the present invention does not necessarily have to calculate the actual value of the maximum lift of the intake valve 20 based on the change amount and the initial value of the maximum lift. The control system may, for example, detect the rotational angle of the crankshaft. The control system of the internal combustion engine may calculate an actual value of an engine state quantity in any suitable manner as long as the control system obtains the actual value based on a change amount and an initial value of the engine state quantity. The state quantity of an engine valve includes the opening timing, the closing timing, the maximum lift, the opening period, the lift profile of the engine valve, and combination of these quantities.

The invention claimed is:

1. A control system for an internal combustion engine, the system comprising: an actuator that operates in a predetermined operating range to change a state quantity of an internal combustion engine; history detecting means, wherein, under a power supplying state, the history detecting means detects change history of the state quantity from an initial value at the start of the power supplying; a volatile memory for storing the change history detected by the history detecting means; and a backup power source for supplying power to the history detecting means and the volatile memory, the control system computing an actual value of the state quantity based on the change history stored in the volatile memory and the initial value, the control system further comprising: remaining data determining means, wherein after power supply by the backup power source is restored from a state in which the power supply is temporarily suspended, the remaining data determining means determines whether or not remaining data of the change history remaining in the volatile memory are the data that have been stored immediately before the suspension of power supply; initial value setting means, wherein, when the remaining data determining means determines that the remaining data of the change history are the data that have been stored immediately before the suspension of power supply, the initial value setting means sets the initial value to an actual value of the state quantity that is computed based on the remaining data; and reference value learning means, wherein, when the remaining data determining means determines that the remaining data is not the data that have been stored immediately before the suspension of power supply, the reference value learning means moves the actuator to a limit position in the operating range, sets the initial value to a reference value of the state quantity that corresponds to the limit position, and clears the change history, wherein, in a case where temporary suspension of the power supply from the backup power source reoccurs before completion of the reference value learning by the reference value learning means, the control system invalidates determination of the remaining data determining means and causes the reference value learning means to carry out the reference value learning, after restoration of the power supply.

2. The control system for an internal combustion engine according to claim 1, wherein the state quantity is a valve state quantity of a valve of the engine.

3. The control system for an internal combustion engine according to claim 1, wherein the reference value learning means stores an information value indicating that the reference value learning is being carried out in a rewritable non-volatile memory, wherein, if the information value indicates that the reference value learning is being carried out when the power supply by the backup power source is restored from temporary suspension, the control system invalidates determination of the remaining data determining means and causes the reference value learning means to perform the reference value learning.

4. The control system for an internal combustion engine according to claim 3, wherein the state quantity is a valve state quantity of a valve of the engine.

5. The control system for an internal combustion engine according to claim 1, wherein: the remaining data determining means stores the data of the change history in a first address of the volatile memory, and stores, in a second address of the volatile memory, data obtained by inverting the logic level of the data bit by bit, wherein, after power supply by the backup power source is restored from a state in which the power supply is temporarily suspended, the remaining data determining means determines that the remaining data in the first address and the second address are the data that have been stored immediately before the suspension of power supply if the exclusive ORs of mutually corresponding bit data of the data remaining in the first address and the data remaining in the second address are all 1.

6. The control system for an internal combustion engine according to claim 5, wherein the reference value learning means stores an information value indicating that the reference value learning is being carried out in a rewritable non-volatile memory, wherein, if the information value indicates that the reference value learning is being carried out when the power supply by the backup power source is restored from temporary suspension, the control system invalidates determination of the remaining data determining means and causes the reference value learning means to perform the reference value learning.

7. The control system for an internal combustion engine according to claim 5, wherein the state quantity is a valve state quantity of a valve of the engine.

* * * * *